US012810848B2

(12) United States Patent
Lillelund et al.

(10) Patent No.: US 12,810,848 B2
(45) Date of Patent: Nov. 24, 2026

(54) CONVERSATION ENGINE AND RELATED METHODS

(71) Applicant: GN HEARING A/S, Ballerup (DK)

(72) Inventors: Christian Lillelund, Ballerup (DK); Ali Özkil, Ballerup (DK)

(73) Assignee: GN HEARING A/S, Ballerup (DK)

( * ) Notice: Subject to any disclaimer, the term of this patent is extended or adjusted under 35 U.S.C. 154(b) by 193 days.

(21) Appl. No.: 17/957,717

(22) Filed: Sep. 30, 2022

(65) Prior Publication Data

US 2023/0114150 A1 Apr. 13, 2023

(30) Foreign Application Priority Data

Sep. 30, 2021 (EP) .................................... 21200329

(51) Int. Cl.

| | |
|---|---|
| ***G10L 15/18*** | (2013.01) |
| ***G06F 40/263*** | (2020.01) |
| ***G06F 40/284*** | (2020.01) |
| ***G06F 40/30*** | (2020.01) |
| ***G06F 40/35*** | (2020.01) |

(Continued)

(52) U.S. Cl.

CPC ........ *G10L 15/1815* (2013.01); *G06F 40/263* (2020.01); *G06F 40/284* (2020.01); *G06F 40/30* (2020.01); *G06F 40/35* (2020.01); *G10L 15/063* (2013.01); *G10L 15/07* (2013.01); *H04L 51/02* (2013.01); *G10L 13/00* (2013.01); *G10L 15/26* (2013.01); *G10L 25/63* (2013.01)

(58) Field of Classification Search

CPC ... G10L 15/1815; G10L 15/063; G10L 15/07; G10L 13/00; G10L 15/26; G10L 25/63; G06F 40/35; G06F 40/284; G06F 40/263; G06F 40/30; H04L 51/02

See application file for complete search history.

(56) References Cited

U.S. PATENT DOCUMENTS 9,812,151 B1 * 11/2017 Amini ..................... G06T 13/40
11,004,013 B2 * 5/2021 Eisenzopf ............. G06N 20/00

(Continued)

OTHER PUBLICATIONS

Yu, Demin, Junrui Tian, Tonghua Su, Zhiying Tu, Xiaofei Xu, and Zhongjie Wang, "Incorporating Multimodal Sentiments into Conversational Bots for Service Requirement Elicitation", Aug. 2021, 2021 IEEE International Conference on Service-Oriented System Engineering (SOSE), pp. 81-90. (Year: 2021).*

(Continued)

*Primary Examiner* — James Boggs
(74) *Attorney, Agent, or Firm* — Vista IP Law Group, LLP

(57) ABSTRACT

A conversation engine includes: an input module for provision of speech data, the speech data including first speech data based on a first speech signal from a first speaker; a sentiment feature extractor for provision of sentiment metric data based on the speech data, the sentiment metric data including first sentiment metric data based on the first speech data; a text feature extractor for provision of text metric data based on the speech data, the text metric data including first text metric data based on the first speech data; a training generator configured to generate a first output sentiment and a first output text based on the first sentiment metric data and/or the first text metric data; and a speech generator configured to output a first output speech signal based on the first output sentiment and the first output text.

17 Claims, 3 Drawing Sheets

(51) Int. Cl.

| | |
|---|---|
| ***G10L 15/06*** | (2013.01) |
| ***G10L 15/07*** | (2013.01) |
| ***H04L 51/02*** | (2022.01) |
| *G10L 13/00* | (2006.01) |
| *G10L 15/26* | (2006.01) |
| *G10L 25/63* | (2013.01) |

(56) References Cited

U.S. PATENT DOCUMENTS

| | | | | |
|---|---|---|---|---|
| 11,037,048 | B2 * | 6/2021 | Liu | G06N 20/00 |
| 11,282,405 | B2 * | 3/2022 | Truong | G10L 15/26 |
| 11,323,566 | B2 * | 5/2022 | Chen | H04M 3/527 |
| 11,443,731 | B2 * | 9/2022 | Aher | G10L 25/63 |
| 11,468,122 | B2 * | 10/2022 | Ickman | G06N 5/043 |
| 11,769,482 | B2 * | 9/2023 | Wang | G10L 13/033<br>704/259 |
| 11,854,538 | B1 * | 12/2023 | Rozgic | G10L 25/63 |
| 12,282,743 | B2 * | 4/2025 | Kelkar | G06F 40/247 |
| 2021/0065222 | A1 * | 3/2021 | Schuh | H04L 67/306 |
| 2022/0366896 | A1 * | 11/2022 | Leong | H04L 51/02 |
| 2023/0039235 | A1 * | 2/2023 | Biswas | G10L 15/22 |

OTHER PUBLICATIONS

Alissa, Mohamad, Issa Haddad, Jonathan Meyer, Jade Obeid, Nicolas Wiecek, and Sukrit Wongariyakavee. "Sentiment Analysis for Open Domain Conversational Agent", Jul. 2021, arXiv preprint arXiv:2101.00675. (Year: 2021).*

Shenoy, Aman, and Ashish Sardana, "Multilogue-Net: A Context-Aware RNN for Multi-modal Emotion Detection and Sentiment Analysis in Conversation", Jul. 2020, Proceedings of the 58th Annual Meeting of the Association for Computational Linguistics (ACL 2020), pp. 19-28. (Year: 2020).*

Zhou, Li, Jianfeng Gao, Di Li, and Heung Yeung Shum, "The Design and Implementation of Xiaolce, an Empathetic Social Chatbot", Mar. 2020, Computational Linguistics, vol. 46, No. 1, pp. 53-93. (Year: 2020).*

Nivethan, and Sriram Sankar, "Sentiment Analysis and Deep Learning Based Chatbot for User Feedback", Jan. 2020, Intelligent Communication Technologies and Virtual Mobile Networks (ICICV 2019), pp. 231-237. (Year: 2020).*

Ye, Qiaofei, "A Sentiment Based Automatic Question-Answering Framework", May 2019, Thesis, Purdue University, pp. 1-70. (Year: 2019).*

Shi, Weiyan, and Zhou Yu, "Sentiment Adaptive End-to-End Dialog Systems", Jul. 2018, Proceedings of the 56th Annual Meeting of the Association for Computational Linguistics (vol. 1: Long Papers), pp. 1509-1519. (Year: 2018).*

Chakrabarti, Chayan, and George F. Luger, "Artificial Conversations for Customer Service Chatter Bots: Architecture, Algorithms, and Evaluation Metrics", May 2015, Expert Systems with Applications, vol. 42, No. 20, pp. 6878-6897. (Year: 2015).*

* cited by examiner

CONVERSATION ENGINE AND RELATED METHODS

RELATED APPLICATION DATA

This application claims priority to, and the benefit of, European Patent Application No. 21200329.7 filed on Sep. 30, 2021. The entire disclosure of the above application is expressly incorporated by reference herein.

FIELD

The present disclosure relates to a conversation engine, related tools and methods, and systems in particular for analysing, monitoring and/or evaluating speech of one or more speakers and generating speech. Thus, a conversation engine and related methods, in particular a method of generating speech and a computer implemented method, are provided.

BACKGROUND

Training calls/conversations, such as conversation training, is a way of improving performances of a person (such as a trainee) during a conversation. Today, training calls/conversations comprise mock calls/conversations with for example actors or trainers.

However, the availability of trainers and/or actors simulating real call/conversations may be limited and costly. Furthermore, a person performing training usually receives feedback in an asynchronous way.

SUMMARY

Accordingly, there is a need for conversation engines and methods with improved conversation training.

A conversation engine is disclosed. The conversation engine comprises an input module for provision of speech data based on a speech signal, including first speech data based on a first speech signal from a first speaker. The conversation engine comprises a sentiment feature extractor for provision of sentiment metric data based on the speech data, the sentiment metric data including first sentiment metric data based on the first speech data. The conversation engine comprises a text feature extractor for provision of text metric data based on the speech data, the text metric data including first text metric data based on the first speech data. The conversation engine comprises a training generator configured to generate a training configuration based on the sentiment metric data and/or the text metric data. The training configuration comprises a first output sentiment and a first output text based on one or more of the first sentiment metric data and the first text metric data. The conversation engine comprises a speech generator configured to output a first output speech signal according to the first output sentiment and the first output text.

Further, a computer implemented method is provided, the method comprising:

obtaining, via an input module, speech data based on a speech signal, including first speech data based on a first speech signal from a first speaker; determining, using a sentiment feature extractor, sentiment metric data based on the speech data, the sentiment metric data including first sentiment metric data based on the first speech data;

determining, using a text feature extractor, text metric data based on the speech data, the text metric data including first text metric data based on the first speech data; generating, using a training generator, a training configuration based on the sentiment metric data and/or the text metric data, the training configuration comprising a first output sentiment and a first output text based on one or more of the first sentiment metric data and the first text metric data; and outputting, using a speech generator, a first output speech signal according to the first output sentiment and the first output text.

It is an advantage of the present disclosure that an improved conversation engine with improved speech generation is provided. The conversation engine provides a more efficient and flexible conversation training for users, e.g. by providing customized conversation training for each user. A user may perform training using the conversation engine whenever the user has time, making the conversation engine more flexible.

By providing sentiment metric data with a sentiment feature extractor, the present disclosure may improve the determination of sentiments (such as emotions) present in speech (such as based on speech data).

By providing text metric data with a text feature extractor, the present disclosure may improve the determination of text present in speech (such as based on speech data).

It may be appreciated that the present disclosure provides a speech generator configured to output an output speech signal, such as the first output speech signal, according to an output sentiment and an output text, such as the first output text, to improve the generation of speech. A user may thereby be provided with an output speech signal giving the user feedback while using the conversation engine, e.g. based on a speech signal from the user. The conversation engine may thereby provide synchronized feedback to the user.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
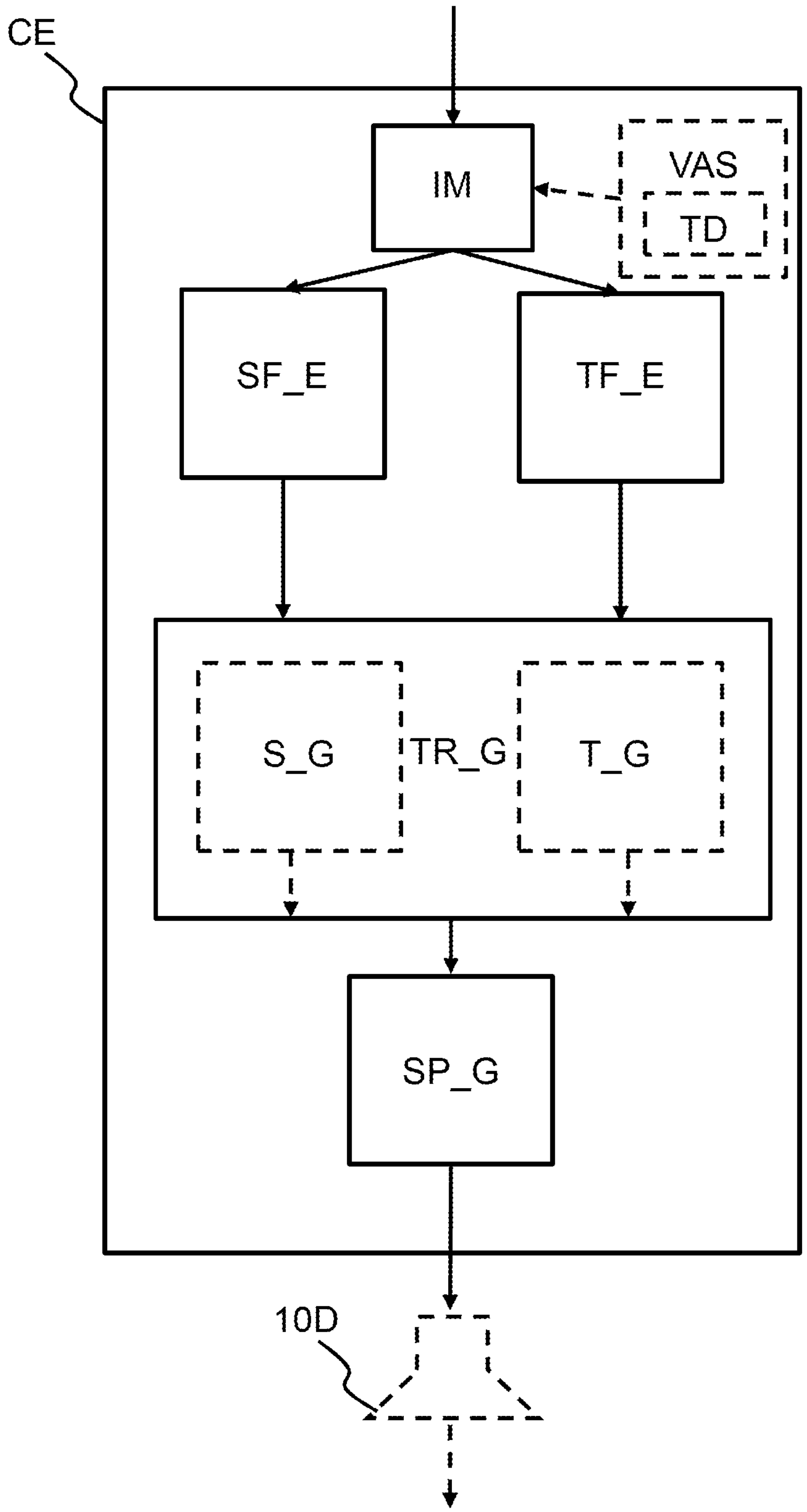
FIG. 1 schematically illustrates an exemplary conversation engine according to the present disclosure, FIG. 2 schematically illustrates an exemplary conversation engine system.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A conversation engine, also denoted CE, is disclosed. The conversation engine CE may comprise one or more interfaces, one or more processors, and a memory. The conversation engine may comprise an electronic device and/or a server device. The conversation engine may be configured to operate on an electronic device and/or a server device. In other words, the conversation engine may be configured to act as a server device and/or an electronic device. An electronic device may for example be or comprise a mobile phone, such as a smartphone, a computer, such as a laptop computer or PC, or a tablet computer. The electronic device may for example be a user device, such as a mobile phone or a computer, configured to perform a conversation with a user. The electronic device may be configured to obtain one or more output speech signals (such as the first output speech signal), and/or output one or more output speech signals including the first output speech signal. A server device may be configured on a cloud, such as a cloud network.

The conversation engine may for example comprise or act as a conversation training device for generating and outputting an output speech signal to a user of the conversation engine. The conversation engine may for example simulate a conversation with a user, such as simulate a customer and/or a caller calling a call center, where the user is to handle the call. A conversation engine may be seen as a voice bot and/or a chat bot.

The conversation engine CE comprises an input module, also denoted IM, for provision of speech data, also denoted SD, based on a speech signal, also denoted SS. The input module may be part of a processor of the conversation engine, or the conversation engine comprises a separate processor acting as the input module, such as an input module processor. A speech signal SS may be representative of speech/voice of a speaker using the conversation engine. The speech data may include first speech data, also denoted SD_1, based on a first speech signal, also denoted SS_1, from a first speaker. The first speech signal SS_1 may be representative of first speech/voice of a first speaker using the conversation engine. The first speaker may be a person performing conversation training on the conversation engine (such as on an electronic device acting as conversation engine). In other words, the first speech data may comprise first conversation data of the first speaker during a first conversation using the conversation engine. To provide speech data may comprise the input module being configured to obtain speech data based on a speech signal.

Providing speech data may comprise obtaining a speech signal (such as an audio input). In other words, the first speech signal SS_1 may be based on a first audio input. The first speech signal may be obtained from a user (such as a person) speaking, e.g. a first training call or a first training conversation. The first speaker may be the user using the conversation engine. The first speaker may start a conversation and the conversation engine may provide one or more answers to a statement of the first speaker. The first speaker and the conversation engine may take turns at speaking, such as speech turns. The first speech data may comprise speech data from one or more speech turns of the first speaker. The first speaker may be a person of interest, such as a user that want to perform conversation training (such as an agent performing customer service training). The first speech signal may be obtained from the electronic device recording first audio input from a first speaker, such as recording the first speaker speaking or talking. Obtaining one or more speech signals may comprise generating one or more speech signals, including the first speech signal. The first speech signal may comprise a first speaker speech signal. The first speech signal may be an agent speech signal or a caller speech signal.

The conversation engine CE comprises a sentiment feature extractor, also denoted SF_E, for provision of sentiment metric data, also denoted SMD, based on the speech data SD, such as based on the speech signal. The sentiment feature extractor SF_E, may be part of a processor of the conversation engine, or the conversation engine comprises a separate processor acting as the sentiment feature extractor SF_E, such as a sentiment feature extractor processor. The sentiment feature extractor SF_E may be configured to determine sentiment metric data based on the speech data. In other words, the sentiment feature extractor SF_E may be configured to determine one or more sentiments (such as emotions) based on the speech data.

The sentiment metric data SMD may include first sentiment metric data, also denoted SMD_1, based on the first speech data SD_1. The first sentiment metric data SMD_1 may be indicative of one or more sentiments of the first speaker.

Providing sentiment metric data SMD, such as first sentiment metric data SMD_1, may comprise to determine one or more sentiment metrics, also denoted SM, indicative of a speaker state of a speaker. Providing sentiment metric data SMD, such as first sentiment metric data SMD_1, may comprise to determine one or more first sentiment metrics, also denoted SM_1_i, i=1, 2, . . . , M, where M is the number of first sentiment metrics, indicative of a first speaker state.

In one or more exemplary conversation engines, the sentiment metric data, such as the first sentiment metric data, may be determined based on a machine learning, ML, model, such as an output of a ML model. The conversation engine may be configured to operate according to a first ML model, such as an emotional analysis model. In other words, the sentiment feature extractor SF_E may operate according to a first ML model, such as an emotional analysis model. In other words, the sentiment metric data, such as the first sentiment metric data, may be inferred by the second ML model.

A ML model may comprise a Linear Regression Model, a Support-Vector-Machine, a Decision Tree Classifier (e.g. Random Forest, XGBoost), a Gaussian Mixture Model, a Hidden Markov Model, and/or a Neural Network. A Neural Network may for example comprise one or more of a linear feed forward layer, a convolutional layer, a recurrent layer, and an attention layer. A ML model may comprise a weighting of one or more speaker features. For example, the ML model may map e.g. a speaker intonation and/or a voice quality to a sentiment metric/type, a sentiment level, and/or a sentiment confidence score. A ML model may comprise parameters in the range of 100000 parameters to 1000000 parameters, e.g. 500000 to 1000000 parameters. A ML model may comprise layers in the range of 5 layers to 20 layers, e.g. 10 layers to 15 layers.

An input to the ML model may comprise one or more of an acoustic features, such as a tone feature. A tone feature may for example be a negative tone or a positive tone. Further an input to the ML model may comprise a spectrogram, a latent (hidden layer activations) representation of a (deep) neural network. An input to the ML model may comprise a static feature vector ("fingerprint"), such as a mean, a variance, a slope, peak distances, modulation spectra. An input to the ML model may comprise frame-wise (low-level) acoustic features such as a pitch of the voice, an energy level, spectral parameters (mel-frequency cepstrum, MFCC; e.g. logMelSpec), spectral statistics (slope, roll-off-points), speech spectral envelope characteristics (e.g. formants, harmonics, ratios of harmonics and formants), and/or voice quality measures like harmonic to noise ratio, HNR, Jitter, and/or Shimmer.

The one or more first sentiment metrics, such as SM_1_1 and/or SM_1_2, may be indicative of a first speaker state, i.e. one or more first sentiment states of the first speaker, and may be based on the first speech signal. The one or more first sentiment metrics SM_1_i may comprise one or more parameters indicative of the first speaker state. The first speaker state of the first speaker may change from one audio input to another, such as a first speech input from the first speaker, a second speech input from the first speaker, and/or a third speech input from the first speaker. The first speech input, the second speech input, and the third speech input may be comprised in the speech data, such as the first speech data, and may be based on the speech signal, such as the first speech signal.

The one or more first sentiment metrics SM_1_i may include a first primary sentiment metric, also denoted SM_1_1, indicative of a primary sentiment state of a first speaker. In other words, SM_1_1 may be indicative of a primary emotion of the first speaker. SM_1_1 may be indicative of a dominating sentiment state and/or a first sentiment state in time of the first speaker, e.g. during a first speech input from the first speaker, such as in the first speech data. A first sentiment metric may be indicative of a primary sentiment state that may be one or more of disappointed, bored, afraid, sad, negative, very negative, frustrated, annoyed, fearful, panicking, hesitant, dissatisfied, angry, surprised, worried, wondering, not understanding, thinking, neutral, positive, very positive, glad, friendly, confident, excited, pleased, satisfied, aroused, content, relaxed, energetic, enthusiastic, service-minded, friendly, polite, helpful, interested, and happy. In one or more exemplary conversation engines, the primary sentiment state of the first speaker may be selected from a primary set of sentiment states.

A first sentiment metric SM_1_i may comprise a first sentiment type identifier, also denoted ST_ID_1_i, where i is an index, and i=1, 2, . . . H, where H is the number of first sentiment type identifiers. In other words, determining one or more first sentiment metrics SM_1_i may comprise determining a first sentiment type identifier ST_ID_1_i, e.g. a first primary sentiment type identifier ST_ID_1_1 of the first primary sentiment metric SM_1_1. A sentiment type identifier is indicative of a sentiment state of a speaker.

A sentiment type identifier may for example be a label, a number or value, such as an integer, corresponding to a specific sentiment (state), a sentiment type and/or a sentiment class. For example, ST_ID_1_i may respectively be selected from the same or different sets of sentiment type identifiers. For example, ST_ID_1_1 may be selected from a primary set of sentiment type identifiers and/or ST_ID_1_2 may be selected from a secondary set of sentiment type identifiers. The primary set of sentiment type identifiers may be different from or the same as the secondary set of sentiment type identifiers. The primary set of sentiment type identifiers and the secondary set of sentiment type identifiers may share one or more, such as a plurality of, sentiment type identifiers.

In one or more exemplary conversation engines, the first primary sentiment metric SM_1_1 comprises a first primary sentiment type identifier ST_ID_1_1 selected from a primary set of sentiment type identifiers ST_ID_SET_1, where ST_ID_SET_1 comprises a plurality of sentiment type identifiers, e.g. including at least three, four, five or more sentiment type identifiers.

In one or more exemplary conversation engines, the primary set of sentiment type identifiers ST_ID_SET_1 is given by:

ST_ID_SET_1={1, 2, 3, 4, 5}, where "1" is indicative of a sentiment, such as "Very negative", "2" is indicative of a sentiment, such as "Negative", "3" is indicative of a sentiment, such as "Neutral", optional "4" is indicative of a sentiment, such as "Positive", and optional "5" is indicative of a sentiment, such as "Very positive".

In one or more exemplary conversation engines, the primary set of sentiment type identifiers ST_ID_SET_1 is given by:

ST_ID_SET_1={"Very negative", "Negative", "Neutral", "Positive", "Very positive"}, e.g. where "Very negative" and/or "Very positive" is optional.

In one or more exemplary conversation engines, the primary set of sentiment type identifiers ST_ID_SET_1 is given by:

ST_ID_SET_1={1, 2, 3, 4, 5}, where "1" is indicative of a sentiment, such as "Angry", "2" is indicative of a sentiment, such as "Low Energy", "3" is indicative of a sentiment, such as "OK Energy", optional "4" is indicative of a sentiment, such as "Friendly, engaged, energetic", and optional "5" is indicative of a sentiment, such as "Highly engaged".

A set of sentiment type identifiers, such as the primary set of sentiment type identifiers and/or the secondary set of sentiment type identifiers, may comprise at least three or at least four different sentiment type identifiers, such as five, six, seven, eight, nine, or more sentiment type identifiers. In other words, each sentiment or sentiment type may have a corresponding ST_ID_1_i. For example, the first primary sentiment metric SM_1_1 may comprise a first primary sentiment type identifier ST_ID_1_1 indicative of or corresponding to the primary sentiment state or the first speaker state being "positive".

A first sentiment metric SM_1_i may comprise a sentiment level, also denoted SL_1_i, i=1, 2, . . . , O, where O is the number of sentiment levels. In other words, determining SM_1_i may comprise determining SL_1_i, e.g. determining SM_1_1 may comprise determining a first primary sentiment level SL_1_1. A sentiment level SL_1_i may indicate a level of the i'th sentiment type. In other words, SL_1_i may indicate a degree of the i'th sentiment type. For example, when ST_ID_1_1 corresponds to the first speaker state "positive", a first primary sentiment level SL_1_1 may be indicative of or correspond to a degree of the sentiment "positive", e.g. at a scale, e.g. from 0 to 1 or from 1 to 10, or selected from "low", "medium", and "high". In other words, a sentiment level of a sentiment metric may be on a scale, e.g. from 0 to 1 or from 1 to 10.

A first sentiment metric SM_1_i may comprise a confidence score, respectively denoted SCS_1_i, i=1, 2, . . . , P, where P is the number of confidence scores. In other words, determining SM_1_i may comprise determining a first confidence score SCS_1_i, e.g. determining first primary sentiment metric SM_1_1 may comprise determining a first primary confidence score SCS_1_1. A confidence score of a sentiment metric may be indicative of a score or a probability of the determined sentiment metric, e.g. sentiment type identifier and/or sentiment level, being correct, e.g. the sentiment state or sentiment type (as identified by the sentiment type identifier of the sentiment metric) being correct. For example, SCS_1_1=0.88 may be indicative of a probability of 88% that the determined ST_ID_1_1, e.g. being "positive", is correct.

Determining sentiment metric data, such as determining one or more first sentiment metrics indicative of a first speaker state, may comprise extracting one or more speaker features from the first speech signal, e.g. wherein the one or more first sentiment metrics are based on the one or more speaker features. The one or more speaker features may comprise paralinguistic features. The one or more speaker features may for example comprise a speaker tone feature, a speaker intonation feature, a speaker power or volume feature, a speaker pitch feature, a speaker voice quality feature, a linguistic feature, an acoustic feature, and/or a speaker spectral band energy feature. A spectral band energy feature may comprise individual bins of spectrograms indicating a signal energy level at a given frequency.

A linguistic feature may comprise specific sentiment related words such as positive and/or negative words. The linguistic feature may be determined based on a text transcript of the speech signal. The text transcript may be obtained by human annotators or using an automatic speech recognition (speech to text) algorithm or service. The linguistic feature may comprise an embedding feature by a deep neural network (e.g. a BERT transformer network or other sequence-to-sequence autoencoders).

In one or more exemplary conversation engines, the sentiment metric data, such as the one or more first sentiment metrics, may be determined based on a machine learning, ML, model, such as an output of a ML model. The inputs to the ML model may be speaker features or the speech signal itself. A ML model may comprise a Linear Regression Model, a Support-Vector-Machine, a Decision Tree Classifier (e.g. Random Forest, XGBoost), a Gaussian Mixture Model, a Hidden Markov Model, and/or a Neural Network. A Neural Network may for example comprise one or more of a linear feed forward layer, a convolutional layer, a recurrent layer, and an attention layer. A ML model may comprise a weighting of one or more speaker features. For example, the ML model may map e.g. a speaker intonation and/or a voice quality to a sentiment metric/type, a sentiment level, and/or a sentiment confidence score. A ML model may comprise parameters in the range of 100000 parameters to 1000000 parameters, e.g. 500000 to 1000000 parameters. A ML model may comprise layers in the range of 5 layers to 20 layers, e.g. 10 layers to 15 layers.

Example of known ML models may be:

"www.researchgate.net/publication/222431291_Emotional_speech_recognition_Resources_feature s_and_methods", "mediatum.ub.tum.de/doc/1523509/1523509.pdf", and "www.researchgate.net/publication/319565810_End-to-end_learning_for_dimensional_emotion_recognition_from_physiological_signals".

For example, a sentiment metric may be derived from a speaker intonation metric, also denoted S, which may be a sum of the normalised variance of fundamental frequency FO/pitch (such as range adapted from 0 to 1 by multiplication with a factor determined on the audio input, such as training audio input, as the inverse of the range of FO variance of the training data of the ML model). For example, a sentiment metric may be derived from a speaker intonation metric S, which may be the normalised (to range 0-1) variance of the signal intensity. To determine the sentiment "aroused" and the sentiment "non-aroused", for example, a threshold of e.g. 1.0 can be applied to S, where aroused is detected when S above or equals to 1.0 and non-aroused is detected for S below 1.0. Further, a sentiment level may be determined or obtained for the sentiment "aroused" or "non-aroused", e.g. in the range 0-1, where S may be divided by two (e.g. the number of speaker features that are part of the sum). Further, a sentiment confidence score may be determined or obtained based on the absolute value of the numeric difference of the normalised FO variance and/or the normalised signal intensity variance.

In one or more exemplary conversation engines, the first sentiment metric data SMD_1 comprises one or more of a first speaking tone parameter, a first speaking trait parameter, and a first vocal trait parameter.

In other words, the sentiment metric data SMD may comprise one or more of a speaking tone parameter, a speaking trait parameter, and a vocal trait parameter. The sentiment metric data SMD, such as the first sentiment metric data SMD_1, may comprise tone metric data, also denoted TMD. In other words, the sentiment metric data SMD may comprise one or more of tone metric data, speech trait data, and vocal trait data of one or more speakers, such as the first speaker.

In one or more exemplary conversation engines, to determine first sentiment metric data SMD_1 may comprise to determine one or more of: first speaking tone data, such as a first speaking tone parameter, first speaking trait data, such as a first speaking trait parameter, and first vocal trait data, such as a first vocal trait parameter.

In one or more exemplary conversation engines, the speaking tone data may comprise one or more speaking tone parameters over time, e.g. over the first speech data, such as over the first conversation.

A speaking tone parameter may be indicative of a tone of a speaker. The first speaking tone parameter may be indicative of a mean speaking tone of the first speaker in the first speech data. For example, the first speaking tone parameter may be indicative of a mean tone of a speaker over a conversation/speech turn and/or a tone outcome of a conversation/speech turn (e.g. the overall tone of the speaker when the conversation/speech turn is terminated). The tone metric data may comprise one or more speech metrics e.g. interruptions, overtalks, long pauses, high or low speech rate, high or low intonation, turn or flip of a speaker (e.g. turning a customer from negative to positive or vice-versa), and/or responsiveness. The tone metric data may comprise count of events, e.g. count of one or more parameters/metrics.

A speaking trait parameter, such as the first speaking trait parameter, may for example comprise an enthusiasm parameter, a friendliness parameter, an empathy parameter, and/or a professionalism parameter, e.g. of the first speaker.

A vocal trait parameter, such as the first vocal trait parameter, may for example comprise a voice pitch parameter, a speaking rate parameter, an intonation variation parameter, and/or a pronunciation parameter.

The conversation engine comprises a text feature extractor, also denoted TF_E, for provision of text metric data, also denoted TMD, based on the speech data SD. The text feature extractor TF_E, may be part of a processor of the conversation engine, or the conversation engine comprises a separate processor acting as the text feature extractor TF_E, such as a text feature extractor processor. In one or more exemplary conversation engines, the text metric data TMD includes first text metric data, also denoted TMD_1, based on the first speech data SD_1. Providing text metric data TMD may comprise to determine input text based on the speech data SD, such as to determine first input text based on the first speech data SD_1. The input text may comprise one or more sentences including one or more words.

The text feature extractor TF_E may comprise a speech-to-text converter, e.g. for providing (such as converting) the speech data SD (e.g. first speech data SD_1, such as the first speech signal SS_1) to text metric data TMD, e.g. first text metric data TMD_1.

In one or more exemplary conversation engines, the text metric data, such as the first text metric data, may be determined based on a machine learning, ML, model, such as an output of a ML model. The conversation engine may be configured to operate according to a second ML model, such as a speech to text analysis model. In other words, the text feature extractor TF_E may operate according to a second ML model, such as a speech to text analysis model. In other words, the text metric data, such as the first text metric data, may be inferred by the second ML model.

In one or more exemplary conversation engines, the text metric data, such as the first text metric data TMD_1, comprises one or more of a sentence including one or more words, one or more language identifiers, a text theme identifier, a text lexical field identifier, and a text definition identifier. A language identifier may comprise a language identifier being indicative of a language, such as English, Spanish, and/or French. A language identifier may comprise an accent identifier being indicative of an accent (e.g. a dialect) of the first speaker, such as United States English, United Kingdom English, Texas accent, London accent, and Canadian French (e.g. characteristic words or pronunciations of words and/or letters indicating an origin or a geographic area). A language identifier may comprise an identifier being indicative of a social layer (such as social stratification), a profession, and/or a certain language use (such as characteristic words or pronunciations indicative a social layer and/or a profession) of the first speaker. A text theme identifier may comprise an identifier being indicative of a theme of the first speech data SD_1 (such as a context and/or a meaning of the first speech data SD_1, e.g. of one or more sentences including one or more words comprised in the first speech data), e.g. based on the first speech signal SS_1 of the first speaker.

A text lexical field identifier may comprise an identifier being indicative of a lexical field of the first speech data SD_1 (such as a certain lexical field being identified based on the first speech data SD_1, e.g. based one or more sentences including one or more words comprised in the first speech data), e.g. based on the first speech signal SS_1 of the first speaker.

A text definition identifier may comprise an identifier being indicative of a definition of one or more words of the first speech data SD_1. A text definition identifier may comprise a definition of one or more words from a database, such as from a dictionary database.

The conversation engine comprises a training generator, also denoted TR_G, configured to generate a training configuration, also denoted TC, based on the sentiment metric data SMD and/or the text metric data TMD. The training generator TR_G, may be part of a processor of the conversation engine, or the conversation engine comprises a separate processor acting as the training generator TR_G, such as a training generator processor. To generate a training configuration based on the sentiment metric data SMD and/or the text metric data TMD may comprise to determine a training configuration based on the sentiment metric data SMD and/or the text metric data TMD. A training configuration may comprise a training scenario, such as a conversation/call scenario. For example, a training configuration TC may comprise a training scenario for the first speaker, e.g. simulating an angry and/or unsatisfied customer/person, an old customer/person, and/or a person with a strong accent. A training configuration may comprise a scenario to solve for the user (e.g. the first speaker) of the conversation engine.

The training configuration TC may comprise a first output sentiment, also denoted OS_1, based on one or more of the sentiment metric data SMD, such as the first sentiment metric data SMD_1 and the text metric data TMD. The training configuration may comprise a first output text OT_1 based on one or more of the sentiment metric data SMD and the text metric data TMD. The training configuration may comprise a first output sentiment and a first output text based on one or more of the first sentiment metric data and the first text metric data. The training configuration may comprise a first output sentiment and a first output text in response to the first speech signal of the first speaker, e.g. in response to a first turn from the first speaker. In one or more exemplary conversation engines, the training generator TR_G may generate a training configuration based on, such as using, word embeddings. In other words, the sentiment metric data SMD and/or the text metric data TMD may be associated with words and/or sentiments that the training generator TR_G may use to generate the training configuration. For example, the training generator TR_G may generate the training configuration based on a current state of the conversation.

The training generator TR_G may generate the training configuration based on one or more speech turns of the first conversation, e.g. based on the last speech turn of the first speaker. It may be appreciated that the training generator TR_G may generate the training configuration based on previous conversations, such as previous conversations of the first speaker.

In one or more exemplary conversation engines, the output sentiment data, such as the first output sentiment, may be generated/determined based on a machine learning, ML, model, such as an output of a ML model. In other words, the output sentiment may be inferred by the third ML model. The conversation engine may be configured to operate according to a third ML model, such as an emotional text to speech model. In other words, the training generator TR_G may operate according to a third ML model, such as an emotional text to speech model, for generating the output sentiment. The third ML model, such as the emotional text to speech model, may comprise an expressive speech generator such as flowtron, Tacotron, and/or Waveglow, e.g. an autoregressive flow-based network for text-to-mel-spectrogram synthesis.

In one or more exemplary conversation engines, the output text, such as the first output text, may be generated/determined based on a machine learning, ML, model, such as an output of a ML model. In other words, the output text may be inferred by the fourth ML model. The conversation engine may be configured to operate according to a fourth ML model, such as a script generator model, for generating the output text. In other words, the training generator TR_G may operate according to a fourth ML model, such as a script generator model. The fourth ML model, such as the script generator model, may comprise an autoregressive language model such as generative pre-trained transformer 3, GPT-3, and/or bidirectional encoder representations from transformers, BERT.

The fourth model, such as the script generator model, may be configured to generate realistic responses on the fly.

In one or more exemplary conversation engines, the training generator TR_G comprises a text generator, also denoted T_G, for provision of the first output text. In one or more exemplary conversation engines, the first output text is based on one or more of the first sentiment metric data and the first text metric data. For example, the first output text may mirror a sentiment, such as a sentiment metric, of the first speaker. The first output text may mirror a language, such as text content, e.g. a text metric, of the first speaker. For example, when the text metric data comprises or is indicative of a text being "negative", the text generator may generate a first output text comprising negative text, e.g. comprising text in a negative lexical field, such as for mirroring a language of the first speaker. In other words, the first output speech signal may comprise or be indicative of text being negative.

For example, when the sentiment metric data comprises or is indicative of a sentiment being "negative", the text generator may generate a first output text comprising negative text, e.g. text in a negative lexical field.

In one or more exemplary conversation engines, the training generator TR_G comprises a sentiment generator, also denoted S_G, for provision of the first output sentiment. In one or more exemplary conversation engines, the first output sentiment is based on one or more of the first sentiment metric data and the first text metric data. For example, the first output sentiment may mirror a sentiment, such as a sentiment metric, of the first speaker. The first output sentiment may mirror a sentiment, such as sentiment type, e.g. a sentiment metric, of the first speaker. For example, when the sentiment metric data comprises or is indicative of a sentiment being "negative", the sentiment generator may generate a first output sentiment being negative, e.g. for mirroring a sentiment of the first speaker. In other words, the first output speech signal may comprise or be indicative of a negative sentiment.

For example, when the sentiment metric data comprises or is indicative of a sentiment being "negative", the sentiment generator may generate a first output sentiment comprising negative text, e.g. text in a negative lexical field.

In one or more exemplary conversation engines, the first output sentiment matches at least partly the first sentiment metric data.

In one or more exemplary conversation engines, the first output text matches at least partly the first text metric data.

In one or more exemplary conversation engines, the first output sentiment matches (such as mimic) at least partly the first sentiment metric data and the first output text matches at least partly the first text metric data. For example, the speaking tone of the first output sentiment may match a speaking tone of the first sentiment metric data. In other words, one or more of the speaking tone, the speaking trait, and the vocal trait of the first output speech signal may match one or more of the speaking tone, the speaking trait, and the vocal trait of the first sentiment metric data, such as one or more of the speaking tone, the speaking trait, and the vocal trait of the first speech signal.

For example, the text content and/or text language of the first output text matches the text content and/or text language of the first text metric data. In other words, one or more of a language identifier, a text theme identifier, a text lexical field identifier, and a text definition identifier may match one or more of a language identifier, a text theme identifier, a text lexical field identifier, and a text definition identifier of the first text metric data.

The conversation engine comprises a speech generator, also denoted SP_G, configured to output an output speech signal, also denoted OSS, such as a first output speech signal OSS_1, according to an output sentiment and an output text, such as according to the first output sentiment and the first output text. The speech generator SP_G, may be part of a processor of the conversation engine, or the conversation engine comprises a separate processor acting as the speech generator SP_G, such as a speech generator processor.

The first output speech signal may be seen as a speech signal of the conversation engine. The first output speech signal may provide a response to the first speech signal, such as response to the first speaker. The first output speech signal may provide a simulated voice for a conversation with the first speaker, such as a simulated voice of a conversation engine speaker. The speech generator may provide an output speech signal of the conversation engine speaker.

The first output speech signal may be representative of a speech/voice of the conversation engine for responding to a speaker using the conversation engine.

The speech generator may be configured to generate the first output speech signal based on speech data, such as second speech data, also denoted SD_2. The second speech data SD_2 may comprise the first output sentiment and the first output text.

In one or more exemplary conversation engines, to output a first output speech signal according to the first output sentiment and the first output text comprises to generate the first output speech signal based on the first output sentiment and/or the first output text. In other words, the speech generator may be configured to generate the first output speech signal based on the first output sentiment and/or the first output text. For example, when the sentiment generator has provided a first output sentiment being "negative", the speech generator may be configured to generate the first output speech based on the "negative" first output sentiment. For example, when the text generator has provided a first output text comprising one or more of a negative language identifier, a negative text theme identifier, a negative text lexical field identifier, and a negative text definition identifier, the speech generator may be configured to generate the first output text based on the "negative" first output text.

In one or more exemplary conversation engines, the first output sentiment comprises one or more of a speaking tone parameter, a speaking trait parameter, and a vocal trait parameter. In other words, the first output speech signal may comprise and/or be based on one or more of a speaking tone parameter, a speaking trait parameter, and a vocal trait parameter.

A speaking tone parameter may be indicative of a tone of the first output speech signal. The first speaking tone parameter may be indicative of a mean speaking tone of the first speaker in the first speech data. For example, the speaking tone parameter may be indicative of a mean tone of a conversation engine speaker over a conversation/speech turn and/or a tone outcome of a conversation/speech turn (e.g. the overall tone of the conversation engine speaker when the conversation/speech turn is terminated). The tone metric data may comprise one or more speech metrics e.g. interruptions, overtalks, long pauses, high or low speech rate, high or low intonation, turn or flip of a speaker (e.g. turning a customer from negative to positive or vice-versa), and/or responsiveness. The tone metric data may comprise count of events, e.g. count of one or more parameters/metrics.

A speaking trait parameter may for example comprise an enthusiasm parameter, a friendliness parameter, an empathy parameter, and/or a professionalism parameter, e.g. of the conversation engine speaker/first speaker.

A vocal trait parameter may for example comprise a voice pitch parameter, a speaking rate parameter, an intonation variation parameter, and/or a pronunciation parameter, e.g. of the conversation engine speaker/first speaker.

In one or more exemplary conversation engines, the output text, such as the first output text, comprises one or more of a sentence including one or more words, one or more language identifiers, a text theme identifier, a text lexical field identifier, and a text definition identifier.

A language identifier may comprise a language identifier being indicative of a language, such as English, Spanish, and/or French. A language identifier may comprise an accent identifier being indicative of an accent (e.g. a dialect) of the first output speech signal, such as an accent (e.g. a dialect) of the conversation engine speaker/first speaker, e.g. as United States English, United Kingdom English, Texas accent, London accent, and Canadian French (e.g. characteristic words or pronunciations of words and/or letters indicating an origin or a geographic area). A language identifier may comprise an identifier being indicative of a social layer (such as social stratification), a profession, and/or a certain language use (such as characteristic words or pronunciations indicative a social layer and/or a profession) of the first output speech signal. A text theme identifier may comprise an identifier being indicative of a theme of the first output speech signal (such as a context and/or a meaning of the first output speech signal, e.g. of one or more sentences including one or more words comprised in the first output speech signal, such as comprised in the second speech data, the first output sentiment and/or the first output text). A text theme identifier may be indicative of a conversation subject, e.g. a complaint, IT, after sales, and/or housing.

A text lexical field identifier may comprise an identifier being indicative of a lexical field of the first output speech signal, such as of the second speech data SD_2, e.g. of the first output sentiment and/or the first output text (such as a certain lexical field being used based on the identified lexical field in the first speech data SD_1, e.g. based one or more sentences including one or more words comprised in the first speech data).

A text definition identifier may comprise an identifier being indicative of a definition of one or more words of the first output speech signal, such as of the second speech data SD_2. A text definition identifier may comprise a definition of one or more words from a database, such as from a dictionary database.

In one or more exemplary conversation engines, the conversation engine comprises a voice activity sensor, also denoted VAS, for detecting speech from the first speaker. The voice activity sensor may be configured to detect speech from the first speaker based on the first speech data, such as based on the first speech signal. The voice activity sensor, such as the conversation engine, may use voice activity detection, VAD, to detect speech from a speaker, such as the first speaker.

In one or more exemplary conversation engines, the voice activity detector comprises a turn detector.

A turn may be seen as a conversation period where a person, such as a speaker, speaks. In other words, one or more persons, such as one or more speakers, having a conversation may take turns at speaking to each other. For example, a conversation period may also be denoted a turn where a person speaks, such as the first conversation period may be denoted a first turn of a first speaker or of a second speaker and/or the second conversation period may be denoted a second turn of a first speaker or of a second speaker. Alternatively and/or additionally, a conversation period may comprise one or more turns of one or more speakers. For example, the first conversation period may comprise a first turn of a first speaker, a first turn of a second speaker, a second turn of a first speaker, and/or a second turn of a second speaker. The end of a turn and the beginning of another turn may be determined by a speaker stopping to speak and another speaker starting speaking and/or a speaker interrupting a speaker while he is speaking. A conversation may be split up or divided in one or more conversation periods. In other words, a conversation may be split up or divided in one or more parts. It may be appreciated that the conversation engine may have a turn, such as a conversation engine turn, when outputting an output speech signal, such as the first output speech signal. In other words, the conversation engine may have one or more turns when responding to the first speaker. The voice activity detector may be configured to detect a conversation engine turn. In one or more exemplary conversation engines, when the voice activity sensor comprises a turn detector, the turn detector is configured to detect a speaker turn. The voice activity sensor, such as the conversation engine, may use voice activity detection, VAD, to detect a speaker turn, e.g. a speaker turn from a speaker, such as the first speaker.

In one or more exemplary conversation engines, the voice activity sensor is configured to detect a termination of a conversation, such as a conversation between a user of the conversation engine and the conversation engine, based on a stop criterion. In other words, the voice activity sensor may be configured to detect a termination of a conversation based on a stop criterion being satisfied.

In other words, the voice activity sensor may be configured to detect a termination of speech. Detecting a termination of a conversation, such as a first conversation, may comprise to detect a termination of the first speaker talking or speaking and/or the conversation engine outputting an output speech signal. A termination of a conversation may for example be a termination of a call, a termination of a sentence, or a termination of a monologue. Detecting a termination of a conversation may comprise detecting a pause longer e.g. than 5 s, 10 s, 30 s, or 1 min. Detecting a termination of a conversation may comprise detecting a user input, one or more speakers talking to another person, a hang up of a call, and/or calendar data. The stop criterion may comprise a time threshold, e.g. an amount of time where no voice has been detected.

In one or more exemplary conversation engines, the conversation engine is configured to obtain one or more audio/conversation recordings. In other words, the conversation engine may be configured to obtain one or more data sets with call/conversation recordings. The one or more audio/conversation recordings may comprise one or more previous call/conversation recordings of a user, e.g. of the first speaker, where the user is the first speaker. For example, the one or more audio/conversation recordings may comprise one or more previous call/conversation recordings of the first speaker with the conversation engine and/or one or more previous call/conversation recordings of the first speaker with a second speaker.

In one or more exemplary conversation engines, the training generator TR_G is configured to be updated according to the one or more audio/conversation recordings. In other words, the training generator TR_G is configured to be trained according to the one or more audio/conversation recordings.

A ML model as disclosed herein, such as the first ML model, the second ML model, the third ML model, and/or the fourth ML model may be updated/trained based on audio/conversation recordings e.g. recording of calls. A ML model as disclosed herein may be trained based on audio/conversation recordings e.g. recording of calls where a validator or supervisor, such as a psychologist and/or human supervisor, have assigned sentiment identifiers/labels for a sentiment metric, e.g. based on their own subjective best effort judgement, and/or speaker feature labels for a speaker feature. A speaker feature may be determined algorithmically via signal processing algorithms and/or as an output of another ML model. An input to the ML model may comprise one or more of an acoustic features, such as a loudness and/or pitch feature. A tone feature may be determined with a ML model, and may for example be a negative tone or a positive tone. Further an input to the ML model may comprise a spectrogram, a latent (hidden layer activations) representation of a (deep) neural network. An input to the ML model may comprise a static feature vector ("fingerprint"), such as a mean, a variance, a slope, peak distances, modulation spectra. An input to the ML model may comprise frame-wise (low-level) acoustic features such as a pitch of the voice, an energy level, spectral parameters (mel-frequency cepstrum, MFCC; e.g. logMelSpec), spectral statistics (slope, roll-off-points), speech spectral envelope characteristics (e.g. formants, harmonics, ratios of harmonics and formants), and/or voice quality measures like harmonic to noise ratio, HNR, Jitter, and/or Shimmer.

In one or more exemplary conversation engines, the conversation engine comprises an audio interface comprising a receiver configured to output the first output speech signal. In other words, the conversation engine may comprise an electronic device comprising an audio interface comprising a receiver configured to output the first output speech signal. A receiver may be seen as comprising a speaker for outputting an output speech signal, such as the first output speech signal.

A computer implemented method is disclosed. The method comprises obtaining, via an input module, speech data based on a speech signal, including first speech data based on a first speech signal from a first speaker.

The method comprises determining, using a sentiment feature extractor, sentiment metric data based on the speech data, the sentiment metric data including first sentiment metric data based on the first speech data. The method comprises determining, using a text feature extractor, text metric data based on the speech data, the text metric data including first text metric data based on the first speech data. The method comprises generating, using a training generator, a training configuration based on the sentiment metric data and/or the text metric data, the training configuration comprising a first output sentiment and a first output text based on one or more of the first sentiment metric data and the first text metric data. The method comprises outputting, using a speech generator, a first output speech signal according to the first output sentiment and the first output text.

The computer implemented method according to the present disclosure may be performed on an electronic device and/or a server device.

Different operations and/or steps of the method and/or the system may be performed at different devices, such as at the electronic device and/or at the server device.

It is to be understood that a description of a feature in relation to method(s) is also applicable to the corresponding feature in the conversation engine, server device, and/or conversation engine system.

FIG. 1 is a schematic block diagram of a conversation engine, such as the conversation engine CE according to the present disclosure. The conversation engine CE comprises an input module IM for provision of speech data SD based on a speech signal SS, including first speech data SD_1 based on a first speech signal SS_1 from a first speaker (such as first speaker 1A of FIG. 2). The conversation engine CE comprises a sentiment feature extractor SF_E for provision of sentiment metric data SMD based on the speech data SD, the sentiment metric data SMD including first sentiment metric data SMD_1 based on the first speech data SD_1. The conversation engine CE comprises a text feature extractor TF_E for provision of text metric data TMD based on the speech data SD, the text metric data TMD including first text metric data TMD_1 based on the first speech data SD_1. The conversation engine CE comprises a training generator TR_G configured to generate a training configuration TC based on the sentiment metric data SMD and/or the text metric data TMD. The training configuration TC comprises a first output sentiment OS_1 and a first output text OT_1 based on one or more of the first sentiment metric data SMD_1 and the first text metric data TMD_1. The conversation engine CE comprises a speech generator SP_G configured to output a first output speech signal OSS_1 according to the first output sentiment OS_1 and the first output text OT_1.

In one or more exemplary conversation engines, the training generator TR_G comprises a text generator, also denoted T_G, for provision of the first output text OT_1. In one or more exemplary conversation engines, the first output text OT_1 is based on one or more of the first sentiment metric data SMD_1 and the first text metric data TMD_1.

In one or more exemplary conversation engines, the training generator TR_G comprises a sentiment generator, also denoted S_G, for provision of the first output sentiment OS_1. In one or more exemplary conversation engines, the first output sentiment OS_1 is based on one or more of the first sentiment metric data SMD_1 and the first text metric data TMD_1.

In one or more exemplary conversation engines, the conversation engine CE comprises a voice activity sensor, also denoted VAS, for detecting speech from the first speaker. The voice activity sensor VAS may be configured to detect speech from the first speaker based on the first speech data SD_1, such as based on the first speech signal SS_1. The voice activity sensor VAS, such as the conversation engine, may use voice activity detection, VAD, to detect speech from a speaker, such as the first speaker. The voice activity sensor VAS may provide, such as generate, the speech signal SS, such as the first speech signal SS_1, to the input module IM. The input module IM may provide the speech data SD, such as the first speech data SD_1, based on the output of the speech signal SS, such as the first speech signal SS_1, from the voice activity sensor VAS. In one or more exemplary conversation engines, the voice activity sensor VAS comprises a turn detector TD being configured to detect a speaker turn. In one or more exemplary conversation engines, the voice activity sensor VAS is configured to detect a termination of a conversation based on a stop criterion.

In one or more exemplary conversation engines, to output a first output speech signal OSS_1 according to the first output sentiment OS_1 and the first output text OT_1 comprises to generate the first output speech signal OSS_1 based on the first output sentiment OS_1 and the first output text OT_1.

In one or more exemplary conversation engines, the first output sentiment OS_1 comprises one or more of a speaking tone parameter, a speaking trait parameter, and a vocal trait parameter.

In one or more exemplary conversation engines, the first output text OT_1 comprises one or more of a sentence including one or more words, one or more language identifiers, a text theme identifier, a text lexical field identifier, and a text definition identifier.

In one or more exemplary conversation engines, the first sentiment metric data SMD_1 comprises one or more of a first speaking tone parameter, a first speaking trait parameter, and a first vocal trait parameter.

In one or more exemplary conversation engines, the first text metric data TMD comprises one or more of a sentence including one or more words, one or more language identifiers, a text theme identifier, a text lexical field identifier, and a text definition identifier.

In one or more exemplary conversation engines, the first output sentiment OS_1 matches at least partly the first sentiment metric data SMD_1 and the first output text OT_1 matches at least partly the first text metric data TMD_1.

In one or more exemplary conversation engines, the conversation engine CE is configured to obtain one or more audio/conversation recordings. In one or more exemplary conversation engines, the training generator TR_G is configured to be updated according to the one or more audio/conversation recordings.

In one or more exemplary conversation engines, the conversation engine CE comprises an audio interface comprising a receiver 10D configured to output the first output speech signal OSS_1. In other words, the conversation engine CE may comprise and/or be implemented in an electronic device (such as electronic device 10 of FIG. 2) comprising an audio interface comprising a receiver 10D configured to output the first output speech signal OSS_1. A receiver may be seen as comprising a speaker for outputting an output speech signal, such as the first output speech signal.

Figure 2:
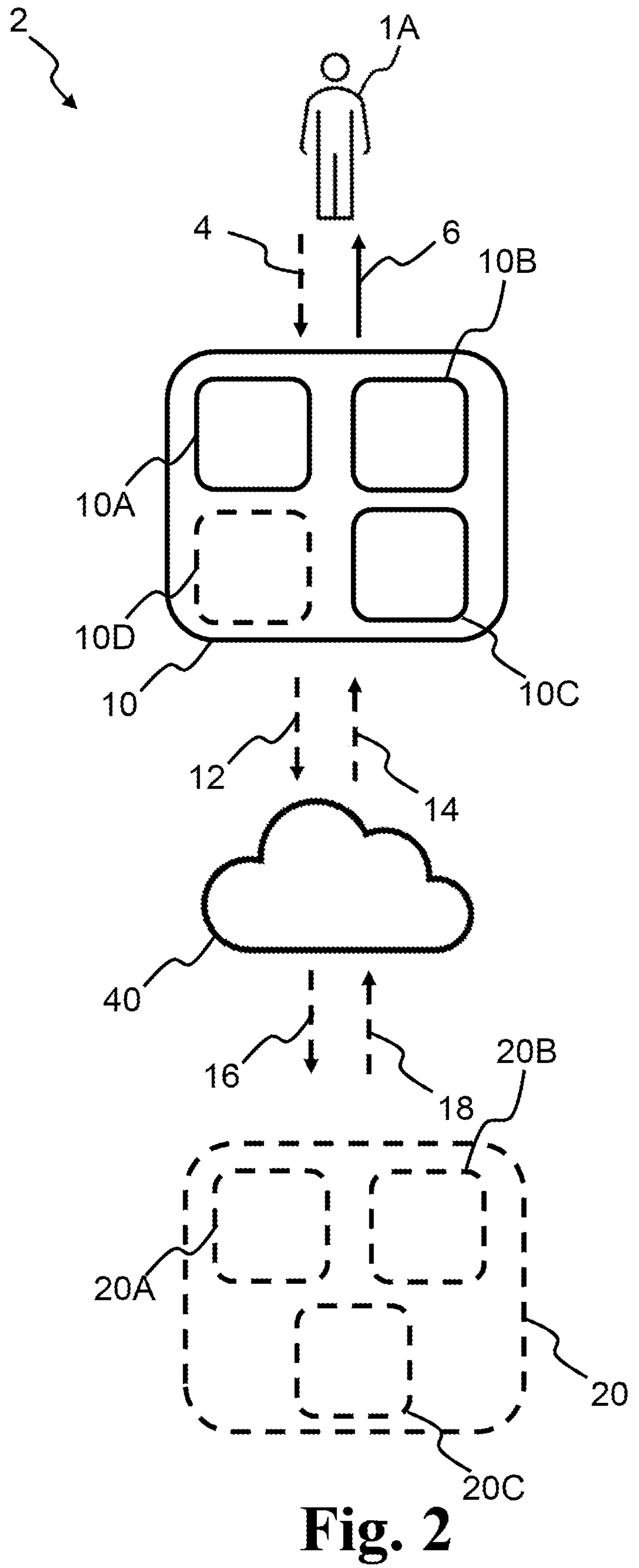

FIG. 2 schematically illustrates an exemplary system, such as conversation engine system 2 according to the present disclosure. The conversation engine CE may be configured to operate on an electronic device 10 and/or a server device 20. In other words, the conversation engine may be configured to act as a server device 20 and/or an electronic device 10. The conversation engine CE as disclosed herein may be implemented fully or partly on the conversation engine system 2. For example, the conversation engine CE may be implemented on an electronic device 10 and/or a server device 20 of the conversation engine system 2.

The system 2 comprises an electronic device 10 and optionally a server device 20. The electronic device 10 comprises a memory 10A, one or more interfaces 10B, and a processor 10C. Optionally, the electronic device 10 comprises an audio interface comprising a receiver 10D configured to output the first output speech signal OSS_1. The server device 20 comprises a memory 20A, one or more interfaces 20B, and one or more processors 20C. A user/first speaker 1A may use the electronic device 10, e.g. being a mobile phone or a computer, for performing or receiving conversation training or coaching.

The electronic device 10 may be configured to act as a user device that the user 1A may use for conversation training or coaching, e.g. for performing one or more training conversations. The electronic device 10, e.g. the processor 10C, may be configured to obtain 4, 14 speech data SD, e.g. representative of one or more voices, the speech data SD including first speech data SD_1 of a first speaker 1A. The speech data SD may be based on one or more speech signals SS including a first speech signal SS_1. The electronic device 10 may be configured to transmit 12 the speech signal, such as the first speech signal, to the server device 20, e.g. via the network 40. The speech data, such as the first speech data may be obtained 14 from the server device 20, e.g. via the network 40 such as a global network, e.g. the internet or a telecommunications network. The speech data, such as the first speech data may be obtained from the memory 10A. The electronic device 10, e.g. the processor 10C, is configured to obtain 4, 14 first speech data based on the first speech signal. The electronic device 10, e.g. the processor 10C, may be configured to obtain first speech data, such as determine first speech data, on the electronic device 10 itself. Optionally, the one or more processors 20C are configured to provide/obtain speech data, such as first speech data, e.g. to determine speech data.

The electronic device 10 and/or the server device 20 may comprise a sentiment feature extractor SF_E for provision of sentiment metric data SMD based on the speech data SD. In other words, the processor 10C and/or the processors 20C may comprise the sentiment feature extractor SF_E and be configured to provide sentiment metric data SMD based on the speech data SD. The sentiment metric data SMD including first sentiment metric data SMD_1 based on the first speech data SD_1. The server device 20 may be configured to transmit 18 the sentiment metric data SMD, such as the first sentiment metric data SMD_1, to the electronic device 10, e.g. via the network 40.

The electronic device 10 and/or the server device 20 may comprise a text feature extractor TF_E for provision of text metric data TMD based on the speech data SD. In other words, the processor 10C and/or the processors 20C may comprise the text feature extractor SF_E and be configured to provide text metric data TMD based on the speech data SD. The text metric data TMD including first text metric data TMD_1 based on the first speech data SD_1. The server device 20 may be configured to transmit 18 the text metric data TMD, such as the first text metric data TMD_1, to the electronic device 10, e.g. via the network 40.

The electronic device 10 and/or the server device 20 may comprise a training generator TR_G configured to generate a training configuration TC based on the sentiment metric data SMD and/or the text metric data TMD. In other words, the processor 10C and/or the processors 20C may comprise the training generator TR_G configured to generate a training configuration TC based on the sentiment metric data SMD and/or the text metric data TMD.

The training configuration TC comprises a first output sentiment OS_1 and a first output text OT_1 based on one or more of the first sentiment metric data SMD_1 and the first text metric data TMD_1. The server device 20 may be configured to transmit 18 the training configuration TC to the electronic device 10, e.g. via the network 40.

The electronic device 10 and/or the server device 20 may comprise a speech generator SP_G configured to output 6, 18 a first output speech signal OSS_1 according to the first output sentiment OS_1 and the first output text OT_1. In other words, the processor 10C and/or the processors 20C may comprise the speech generator SP_G configured to output 6, 18, e.g. via the interface 10B and/or interface 20B, a first output speech signal according to the first output sentiment and the first output text.

Optionally, the training generator TR_G comprises a text generator T_G for provision of the first output text OT 1, where the first output text OT_1 is based on one or more of the first sentiment metric data SMD_1 and the first text metric data TMD_1. In other words, the electronic device 10 and/or the server device 20 may comprise the text generator T_G. The server device 20 may be configured to transmit 18 the first output text OT_1 to the electronic device 10, e.g. via the network 40.

Optionally, the training generator TR_G comprises a sentiment generator S_G for provision of the first output sentiment OS_1, where the first output sentiment OS_1 is based on one or more of the first sentiment metric data SMD_1 and the first text metric data TMD_1. In other words, the electronic device 10 and/or the server device 20 may comprise the sentiment generator T_G. The server device 20 may be configured to transmit 18 the first output sentiment OS_1 to the electronic device 10, e.g. via the network 40.

Optionally, the electronic device 10 and/or the server device 20 comprise a voice activity sensor VAS for detecting speech from the first speaker 1A. In other words, the processor 10C and/or the processors 20C may comprise the voice activity sensor VAS.

Optionally, the electronic device 10 and/or the server device 20 are configured to obtain one or more audio/conversation recordings. The server device 20 may be configured to transmit 18 the one or more audio/conversation recordings to the electronic device 10, e.g. via the network 40. The electronic device 10 may be configured to transmit 12 the one or more audio/conversation recordings to the server device 20, e.g. via the network 40.

Optionally, the electronic device 10 and/or the server device 20 are configured to update the training generator TR_G according to the one or more audio/conversation recordings.

Figure 3:
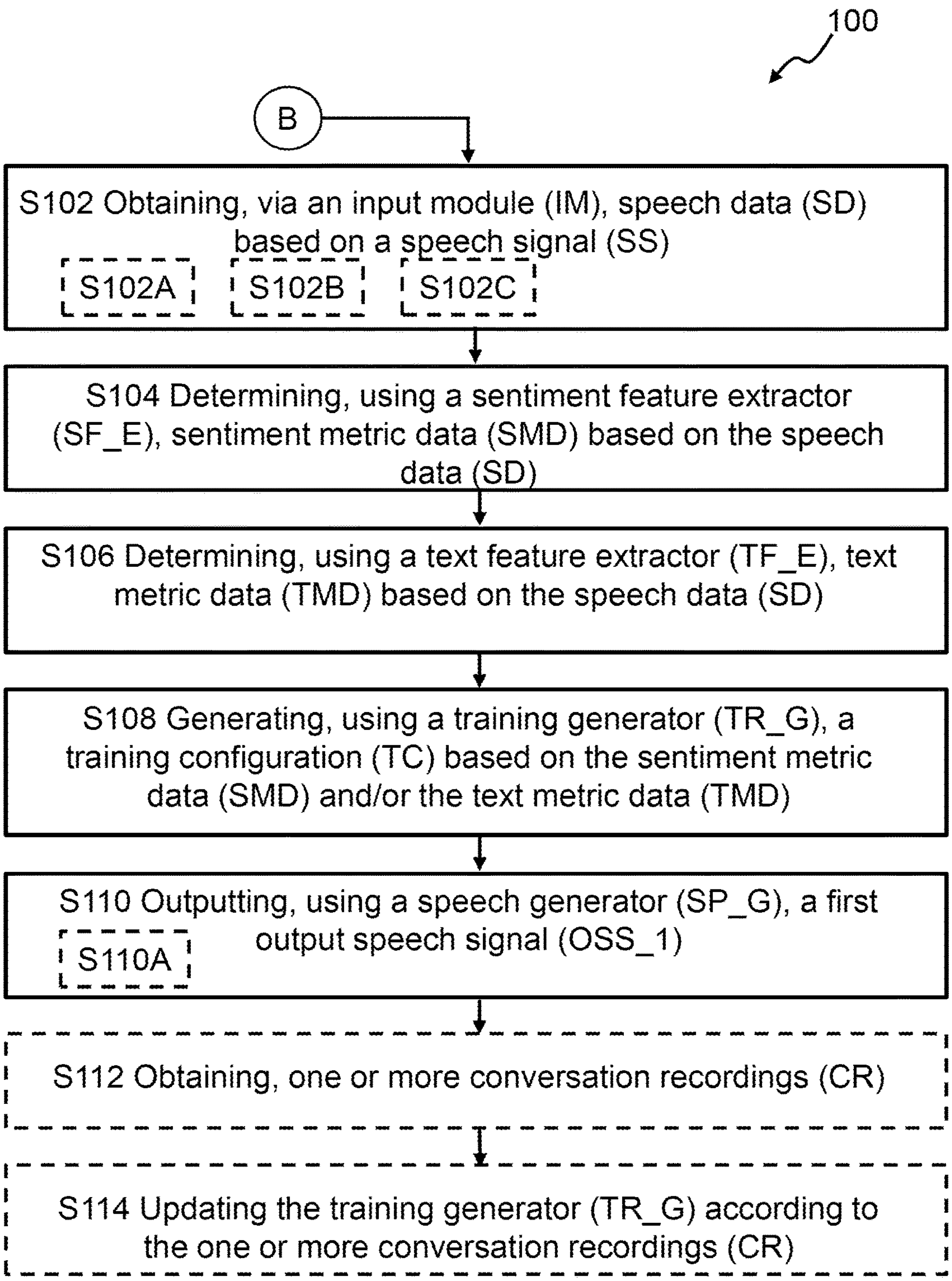
FIG. 3 is a flow diagram of an exemplary method according to the disclosure.

The electronic device 10 and/or the server device 20 may be configured to perform any of the methods disclosed in FIG. 3.

The electronic device 10, e.g. the processor 10C is optionally configured to perform any of the operations disclosed in FIG. 3 (such as any one or more of S108A, S108B, S110A, S112, S114). The operations of the electronic device may be embodied in the form of executable logic routines (for example, lines of code, software programs, etc.) that are stored on a non-transitory computer readable medium (for example, memory 10A) and are executed by the processor 10C).

Furthermore, the operations of the electronic device 10 may be considered a method that the electronic device 10 is configured to carry out. Also, while the described functions and operations may be implemented in software, such functionality may as well be carried out via dedicated hardware or firmware, or some combination of hardware, firmware and/or software.

The server device, e.g. the processor 20C, is optionally configured to perform any of the operations disclosed in FIGS. 2A-2B (such as any one or more of S108A, S108B, S110A, S112, S114). The operations of the server device may be embodied in the form of executable logic routines (for example, lines of code, software programs, etc.) that are stored on a non-transitory computer readable medium (for example, memory 20A) and are executed by the one or more processors 20C). Furthermore, the operations of the server device 20 may be considered a method that the server device 20 is configured to carry out. Also, while the described functions and operations may be implemented in software, such functionality may as well be carried out via dedicated hardware or firmware, or some combination of hardware, firmware and/or software.

Optionally, the electronic device 10 and/or the server device 20, such as the processor 10C and/or the processors 20C, are configured to run and/or operate according to one or more of the first ML model, the second ML model, the third ML model, and the fourth ML model.

FIG. 3 shows a flow diagram of an exemplary method. A computer implemented method 100 is disclosed, such as a method of operating a conversation engine as disclosed herein (such as the conversation engine CE of FIG. 1 and/or FIG. 2). The method 100 may be performed by the conversation engine such as conversation engine of FIG. 1 and/or FIG. 2.

The method 100 comprises obtaining S102, via an input module, speech data based on a speech signal, including first speech data based on a first speech signal from a first speaker.

The method 100 comprises determining S104, using a sentiment feature extractor, sentiment metric data based on the speech data, the sentiment metric data including first sentiment metric data based on the first speech data.

The method 100 comprises determining S106, using a text feature extractor, text metric data based on the speech data, the text metric data including first text metric data based on the first speech data.

The method 100 comprises generating S108, using a training generator, a training configuration based on the sentiment metric data and/or the text metric data, the training configuration comprises a first output sentiment and a first output text based on one or more of the first sentiment metric data and the first text metric data.

The method 100 comprises outputting S110, using a speech generator, a first output speech signal according to the first output sentiment and the first output text.

In one or more example methods, to output a first output speech signal according to the first output sentiment and the first output text comprises generating S110A the first output speech signal based on the first output sentiment and the first output text.

In one or more example methods, the method 100 comprises detecting S102A, using a voice activity sensor, speech from the first speaker.

In one or more example methods, the method 100 comprises detecting S102B, using a turn detector, a speaker turn.

In one or more example methods, the method 100 comprises obtaining S112 one or more audio/conversation recordings.

In one or more example methods, the method 100 comprises updating S114 the training generator according to the one or more audio/conversation recordings.

In one or more example methods, the method 100 comprises restarting/reiterating B one or more steps of the method.

The use of the terms “first”, “second”, “third” and “fourth”, “primary”, “secondary”, “tertiary” etc. does not imply any particular order, but are included to identify individual elements. Moreover, the use of the terms “first”, “second”, “third” and “fourth”, “primary”, “secondary”, “tertiary” etc. does not denote any order or importance, but rather the terms “first”, “second”, “third” and “fourth”, “primary”, “secondary”, “tertiary” etc. are used to distinguish one element from another. Note that the words “first”, “second”, “third” and “fourth”, “primary”, “secondary”, "tertiary" etc. are used here and elsewhere for labelling purposes only and are not intended to denote any specific spatial or temporal ordering.

Memory may be one or more of a buffer, a flash memory, a hard drive, a removable media, a volatile memory, a non-volatile memory, a random access memory (RAM), or other suitable device. In a typical arrangement, memory may include a non-volatile memory for long term data storage and a volatile memory that functions as system memory for the processor. Memory may exchange data with processor over a data bus.

Memory may be considered a non-transitory computer readable medium.

Memory may be configured to store information (such as information indicative of the speech data, the speech signal, the sentiment metric data, the text metric data, the training configuration, the output sentiment, the output text, and/or the output speech signal) in a part of the memory.

Furthermore, the labelling of a first element does not imply the presence of a second element and vice versa.

It may be appreciated that FIGS. 1-3 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES

1A user, first speaker
2 system
4 user input/speech signal
6 output speech signal
10 electronic device
10A memory
10B one or more interfaces
10C processor
10D receiver
12 transmit
14 obtain
16 obtain
18 transmit
20 server device
20A memory
20B interface
20C one or more processors
22 transmit
24 obtain
40 network
CE conversation engine
DD deficiency data
DD_1 first deficiency data
DD_2 second deficiency data
IM input module
OS output sentiment
OS_1 first output sentiment
OSS output speech signal
OSS_1 first output speech signal
OT output text
OT_1 first output text
SFE sentiment feature extractor
S_G sentiment generator
SP_G speech generator
SCS sentiment confidence score
SCS_1 first sentiment confidence score
SCS_1_1 first primary sentiment confidence score
SCS_1_2 first secondary sentiment confidence score
SCS_2_1 second primary sentiment confidence score
SL sentiment level
SL_1_1 first primary sentiment level
SL_1_2 first secondary sentiment level
SL_2_1 second primary sentiment level
SM sentiment metrics
SM_1 first sentiment metric
SM_1_1 first primary sentiment metric
SM_1_2 first secondary sentiment metric
SM_2 second sentiment metric
SM_2_1 second primary sentiment metric
SM_2_2 second secondary sentiment metric
ST_ID_1_1 first primary sentiment type identifier
ST_ID_1_2 first secondary sentiment type identifier
ST_ID_2_1 second primary sentiment type identifier
ST_ID_2_2 second secondary sentiment type identifier
ST_ID_SET_1 primary set of sentiment type identifiers ST_ID_SET_2 secondary set of sentiment type identifiers
SMD sentiment metric data
ST_ID sentiment type identifier
ST_ID_1 first sentiment type identifier
ST_ID_1_1 first primary sentiment type identifier
ST_ID_1_2 first secondary sentiment type identifier
ST_ID_SET set of sentiment type identifiers
ST_ID_SET_1 primary set of sentiment type identifiers
ST_ID_SET_2 secondary set of sentiment type identifiers
SD speech data
SD_1 first speech data
SS speech signal
SS_1 first speech signal
TC training configuration
TF_E text feature extractor
TR_G training generator
T_G text generator
TMD text metric data
VAS voice activity sensor
100 computer implemented method
S102 obtaining speech data
S102A detecting speech
S102B detecting a speaker turn
S102C detecting a termination of a conversation
S104 determining sentiment metric data
S106 determining text metric data
S108 generating training configuration
S110 outputting a first output speech signal
S110A generating the first output speech signal
S112 obtaining one or more conversation recordings
S114 updating the training generator
B reiterate, restart

The invention claimed is:

1. A conversation engine comprising:
an input module for provision of speech data, the speech data including first speech data based on a first speech signal;
a sentiment feature extractor for provision of sentiment metric data based on the speech data, the sentiment metric data including first sentiment metric data based on the first speech data;
a text feature extractor for provision of text metric data based on the speech data, the text metric data including first text metric data based on the first speech data;
a training generator comprising (1) a sentiment generator configured to generate a first output sentiment representing a sentiment of a first output speech signal to be provided by the conversation engine, and (2) a text generator configured to generate a first output text, wherein the first output sentiment and the first output text are based on the first sentiment metric data and/or the first text metric data, wherein the first output sentiment and the first output text are based on processing performed by machine learning models comprising a first machine learning model trained to perform sentiment processing, and a second machine learning model trained to perform text processing; and
a speech generator configured to output a first output speech signal based on the first output sentiment and the first output text, wherein the first output speech has a content that corresponds with the first output text, wherein the first output speech has the sentiment that corresponds with the first output sentiment, and wherein the first output speech is a conversational training speech;
wherein the conversation engine is configured to obtain an audio/conversation recording of an interaction between a first human speaker and a second human speaker after the first output speech signal is outputted by the speech generator, and wherein the training generator is configured to be updated according to the audio/conversation recording of the interaction between the first human speaker and the second human speaker.

2. The conversation engine according to claim 1, wherein the first output sentiment comprises a speaking tone parameter, a speaking trait parameter, a vocal trait parameter, or any combination of the foregoing.

3. The conversation engine according to claim 1, wherein the first output text comprises a sentence including one or more words, one or more language identifiers, a text theme identifier, a text lexical field identifier, a text definition identifier, or any combination of the foregoing.

4. The conversation engine according to claim 1, further comprising a voice activity sensor configured to detect speech.

5. The conversation engine according to claim 4, wherein the voice activity sensor comprises a turn detector, the turn detector being configured to detect a speaker turn.

6. The conversation engine according to claim 4, wherein the voice activity sensor is configured to detect a termination of a conversation based on a stop criterion.

7. The conversation engine according to claim 1, wherein the first sentiment metric data comprises a first speaking tone parameter, a first speaking trait parameter, a first vocal trait parameter, or any combination of the foregoing.

8. The conversation engine according to claim 1, wherein the first text metric data comprises a sentence including one or more words, one or more language identifiers, a text theme identifier, a text lexical field identifier, a text definition identifier, or any combination of the foregoing.

9. The conversation engine according to claim 1, wherein the first output sentiment matches at least partly the first sentiment metric data.

10. The conversation engine according to claim 1, wherein the first output text matches at least partly the first text metric data.

11. The conversation engine according to claim 1, further comprising a receiver configured to output the first output speech signal.

12. The conversation engine according to claim 1, wherein the sentiment feature extractor comprises the first machine learning model, and wherein the text feature extractor comprises the second machine learning model.

13. The conversation engine according to claim 1, wherein the sentiment generator is coupled between the sentiment feature extractor and the speech generator, and wherein the text generator is coupled between the text feature extractor and the speech generator.

14. A computer implemented method, comprising:
obtaining, via an input module, speech data, the speech data including first speech data based on a first speech signal;
determining, using a sentiment feature extractor, sentiment metric data based on the speech data, the sentiment metric data including first sentiment metric data based on the first speech data;
determining, using a text feature extractor, text metric data based on the speech data, the text metric data including first text metric data based on the first speech data;
generating, using a training generator that comprises a sentiment generator and a text generator, (1) a first output sentiment representing a sentiment of a first output speech signal to be provided, and (2) a first output text, wherein the first output sentiment and the first output text are based on the first sentiment metric data and/or the first text metric data, wherein the first output sentiment and the first output text are based on processing performed by machine learning models comprising a first machine learning model trained to perform sentiment processing, and a second machine learning model trained to perform text processing; and outputting, using a speech generator, a first output speech signal based on the first output sentiment and the first output text, wherein the first output speech has a content that corresponds with the first output text, wherein the first output speech has the sentiment that corresponds with the first output sentiment, and wherein the first output speech is a conversational training speech;

wherein the method further comprises obtaining an audio/conversation recording of an interaction between a first human speaker and a second human speaker after the first output speech signal is outputted by the speech generator, and updating the training generator according to the audio/conversation recording of the interaction between the first human speaker and the second human speaker.

15. The method according to claim 14, further comprising detecting a speaker turn.

16. The method according to claim 14, wherein the sentiment feature extractor comprises the first machine learning model, and wherein the text feature extractor comprises the second machine learning model.

17. The method according to claim 14, wherein the sentiment generator is coupled between the sentiment feature extractor and the speech generator, and wherein the text generator is coupled between the text feature extractor and the speech generator.

* * * * *